US009652282B2

(12) United States Patent
Cuadra et al.

(10) Patent No.: US 9,652,282 B2
(45) Date of Patent: May 16, 2017

(54) SOFTWARE-ASSISTED INSTRUCTION LEVEL EXECUTION PREEMPTION

(75) Inventors: Philip Alexander Cuadra, Mountain View, CA (US); Christopher Lamb, San Jose, CA (US); Lacky V. Shah, Los Altos Hills, CA (US)

(73) Assignee: NVIDIA Corporation, Santa Clara, CA (US)

(*) Notice: Subject to any disclaimer, the term of this patent is extended or adjusted under 35 U.S.C. 154(b) by 1018 days.

(21) Appl. No.: 13/291,476

(22) Filed: Nov. 8, 2011

(65) Prior Publication Data
US 2013/0117760 A1    May 9, 2013

(51) Int. Cl.
| G06F 9/46  | (2006.01) |
| G06F 15/00 | (2006.01) |
| G06F 7/38  | (2006.01) |
| G06F 9/00  | (2006.01) |
| G06F 9/44  | (2006.01) |
| G06F 9/38  | (2006.01) |

(52) U.S. Cl.
CPC ............ *G06F 9/461* (2013.01); *G06F 9/3842* (2013.01); *G06F 9/3844* (2013.01); *G06F 9/3846* (2013.01); *G06F 9/3848* (2013.01); *G06F 9/3851* (2013.01); *G06F 9/3861* (2013.01); *G06F 9/3887* (2013.01); *G06F 9/46* (2013.01)

(58) Field of Classification Search
None
See application file for complete search history.

(56) References Cited

U.S. PATENT DOCUMENTS

| 8,095,782 | B1* | 1/2012 | Danskin et al. ............. 712/228 |
| 8,108,879 | B1* | 1/2012 | Garlick et al. .............. 718/108 |
| 8,151,095 | B1* | 4/2012 | Wilt ............................ 712/228 |
| 8,443,368 | B2* | 5/2013 | Guilley et al. .............. 718/103 |
| 2003/0204554 | A1* | 10/2003 | Lake et al. .................... 709/107 |
| 2006/0101252 | A1* | 5/2006 | Tomisawa .................... 712/228 |
| 2007/0091102 | A1* | 4/2007 | Brothers et al. ............. 345/506 |
| 2007/0294517 | A1* | 12/2007 | Ayrignac et al. ............ 712/228 |
| 2008/0010442 | A1* | 1/2008 | Hochschild et al. ........ 712/228 |
| 2010/0083258 | A1* | 4/2010 | Messmer ...................... 718/102 |
| 2010/0122259 | A1* | 5/2010 | Gosalia et al. .............. 718/102 |
| 2011/0067034 | A1* | 3/2011 | Kawamoto ................... 718/108 |
| 2011/0078702 | A1* | 3/2011 | Hosoki ........................ 718/108 |
| 2012/0191958 | A1* | 7/2012 | Wilt ............................ 712/228 |
| 2012/0246658 | A1* | 9/2012 | Arndt et al. ................. 718/102 |

* cited by examiner

*Primary Examiner* — Charles Swift
(74) *Attorney, Agent, or Firm* — Artegis Law Group, LLP

(57) ABSTRACT

One embodiment of the present invention sets forth a technique for instruction level execution preemption. Preempting at the instruction level does not require any draining of the processing pipeline. No new instructions are issued and the context state is unloaded from the processing pipeline. Any in-flight instructions that follow the preemption command in the processing pipeline are captured and stored in a processing task buffer to be reissued when the preempted program is resumed. The processing task buffer is designated as a high priority task to ensure the preempted instructions are reissued before any new instructions for the preempted context when execution of the preempted context is restored.

20 Claims, 11 Drawing Sheets

SOFTWARE-ASSISTED INSTRUCTION LEVEL EXECUTION PREEMPTION

BACKGROUND OF THE INVENTION

Field of the Invention

The present invention generally relates to program execution preemption and more specifically to instruction level execution preemption.

Description of the Related Art

Preemption is a mechanism to time-slice a processor between multiple different applications. When multiple different applications need to use the processor simultaneously, one way to achieve forward progress on all the applications is to run each application for a short time-slice on the processor. Conventionally, time slicing requires that the processor pipeline be completely drained and when the processor is idle, a different application is switched in to be executed by the processor pipeline. This mechanism for time slicing has been referred to as "wait for idle" preemption and the mechanism does not work well when the processor takes a long time to drain the work that is running on the processor pipeline. For example, consider a very long running graphics shader program, or in the worst case, a shader program with an infinite loop. To be able to time slice between different applications, the amount of time needed to idle execution of each application should be limited so that long running applications do not effectively reduce the time slice available for other applications.

Another mechanism that has been considered to implement preemption, is to stall or freeze the processor and then store the contents of all the registers and pipeline flip-flops within the processor and later restore the contents of all of the registers and pipeline flip-flops within the processor. Storing and restoring the contents of all of the registers and pipeline flip-flops typically results in a very large amount of state to be saved and restored. The time needed to store and restore the state reduces the time available for executing each of the applications during the time slices.

Accordingly, what is needed in the art is a system and method for execution preemption that either does not require storing the entire state of an application when the application is preempted or does not require waiting for a processing pipeline to become idle to preempt the application.

SUMMARY OF THE INVENTION

A system and method for instruction level execution preemption does not require any draining of the processing pipeline. No new instructions are issued and the context state is unloaded from the processing pipeline. Any in-flight instructions that follow the preemption command in the processing pipeline are captured and stored in a processing task buffer to be reissued when the preempted program is resumed. The processing task buffer is designated as a high priority task to ensure the preempted instructions are reissued before any new instructions for the preempted context when execution of the preempted context is restored.

Various embodiments of a method of the invention for preempting execution of program instructions in a multi-threaded system include executing program instructions in a processing pipeline within the multi-threaded system using a first context. Execution using the first context is preempted to execute different program instructions in the multi-threaded system using a second context. A preemption-restore kernel is invoked that encodes a preemption restore processing task as a task metadata (TMD) for execution when the first context is restored. The different program instructions are executed in the processing pipeline using the second context.

Various embodiments of the invention include a multi-threaded system for preempting execution of program instructions. The multi-threaded system comprises a memory, a host interface, and a processing pipeline. The memory is configured to store program instruction corresponding to a first context and different program instructions corresponding to a second context. The host interface is coupled to the processing pipeline and configured to preempt execution of the program instructions using the first context to execute different program instructions using a second context. The processing pipeline is configured to execute the program instructions using the first context, preempt execution of the program instructions using the first context to execute the different program instructions using the second context, invoke a preemption-restore kernel that encodes a preemption restore processing task as a task metadata (TMD) for execution when the first context is restored, and execute the different program instructions using the second context.

The preemption mechanism minimizes the amount of state that is saved when an application is preempted and that is restored when the application resumes execution. Additionally, long running applications can be quickly preempted at the instruction level.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
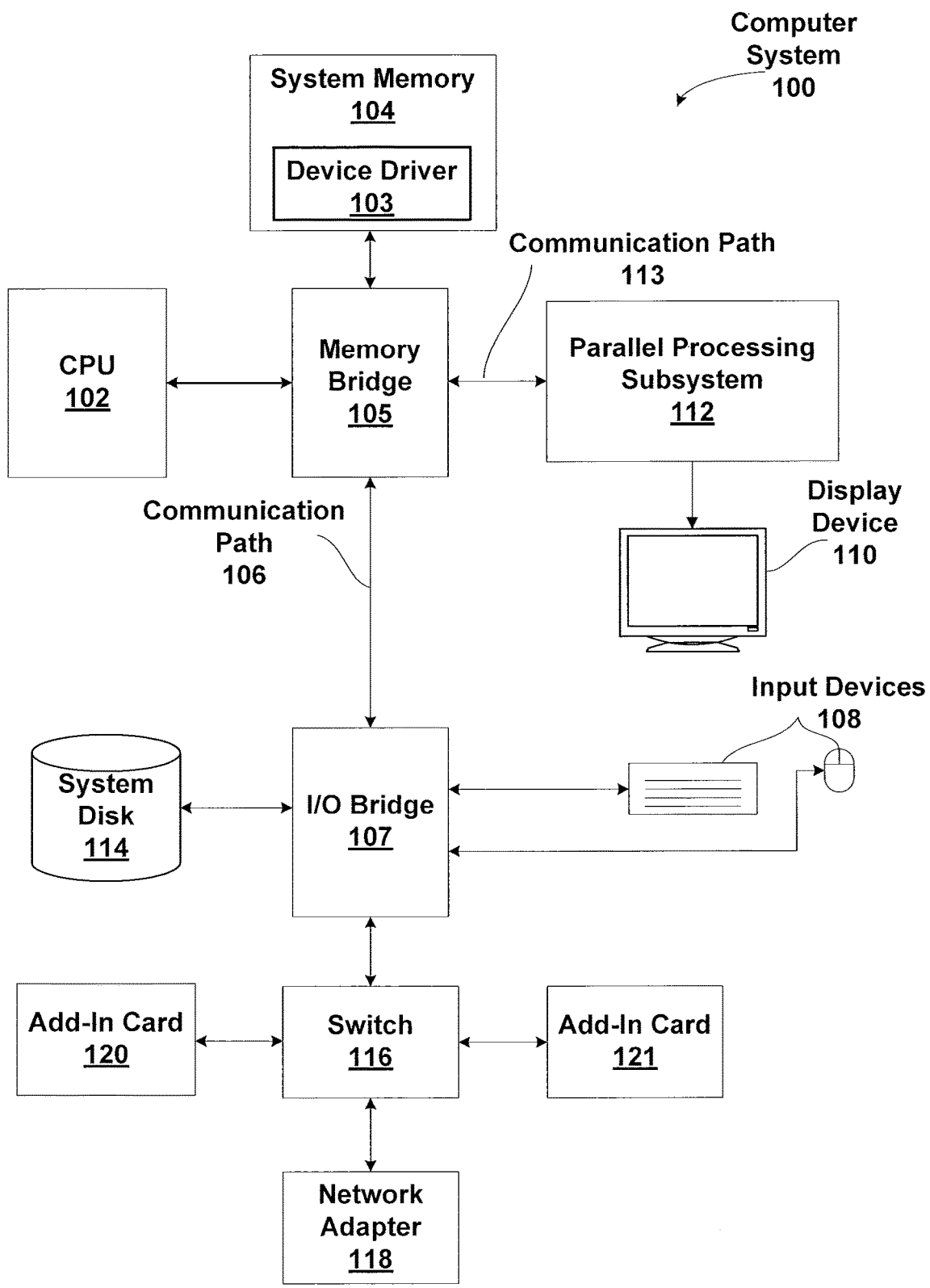
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
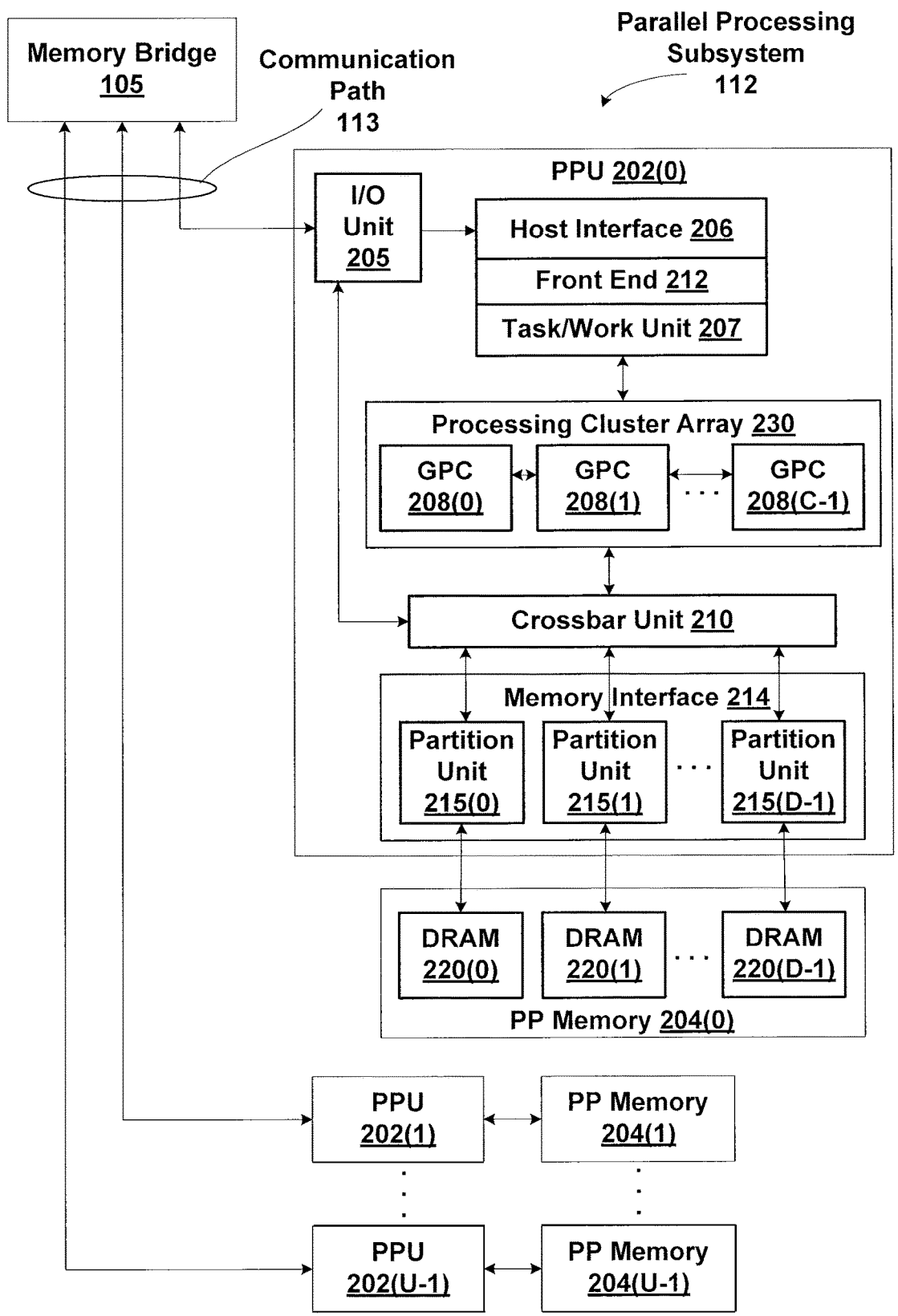
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/ work unit 207 receives the tasks and dynamically schedules the processing tasks and child processing tasks for execution by the GPCs 208.

Figure 3A:
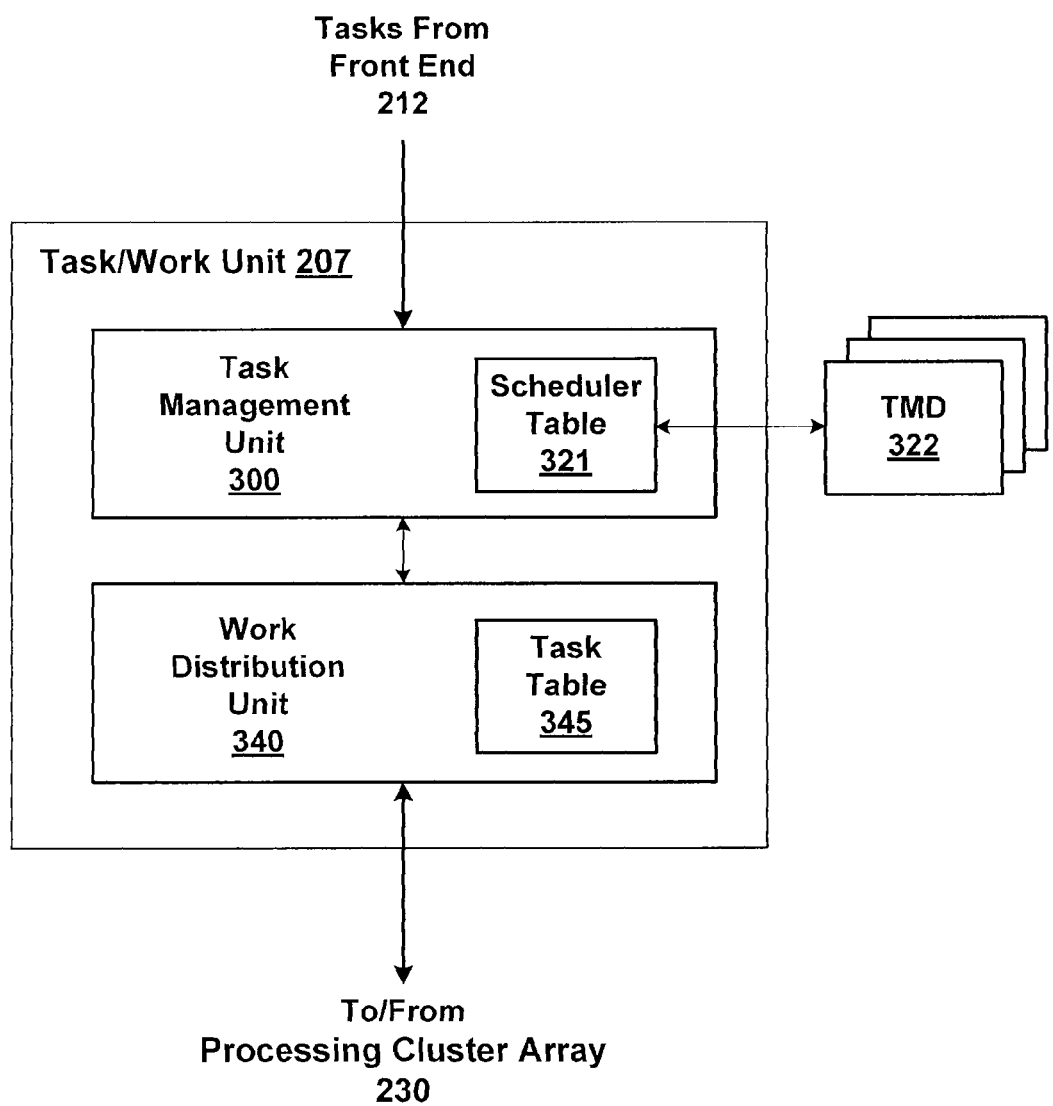
FIG. 3A is a block diagram of the Task/Work Unit of FIG. 2, according to one embodiment of the invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a linked list of pointers to the TMDs 322 corresponding to the tasks in the scheduler table 321. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child processing task is added to a linked list in the scheduler table 321. A task is removed from a slot when the task is evicted.

Task Processing Overview

Figure 3B:
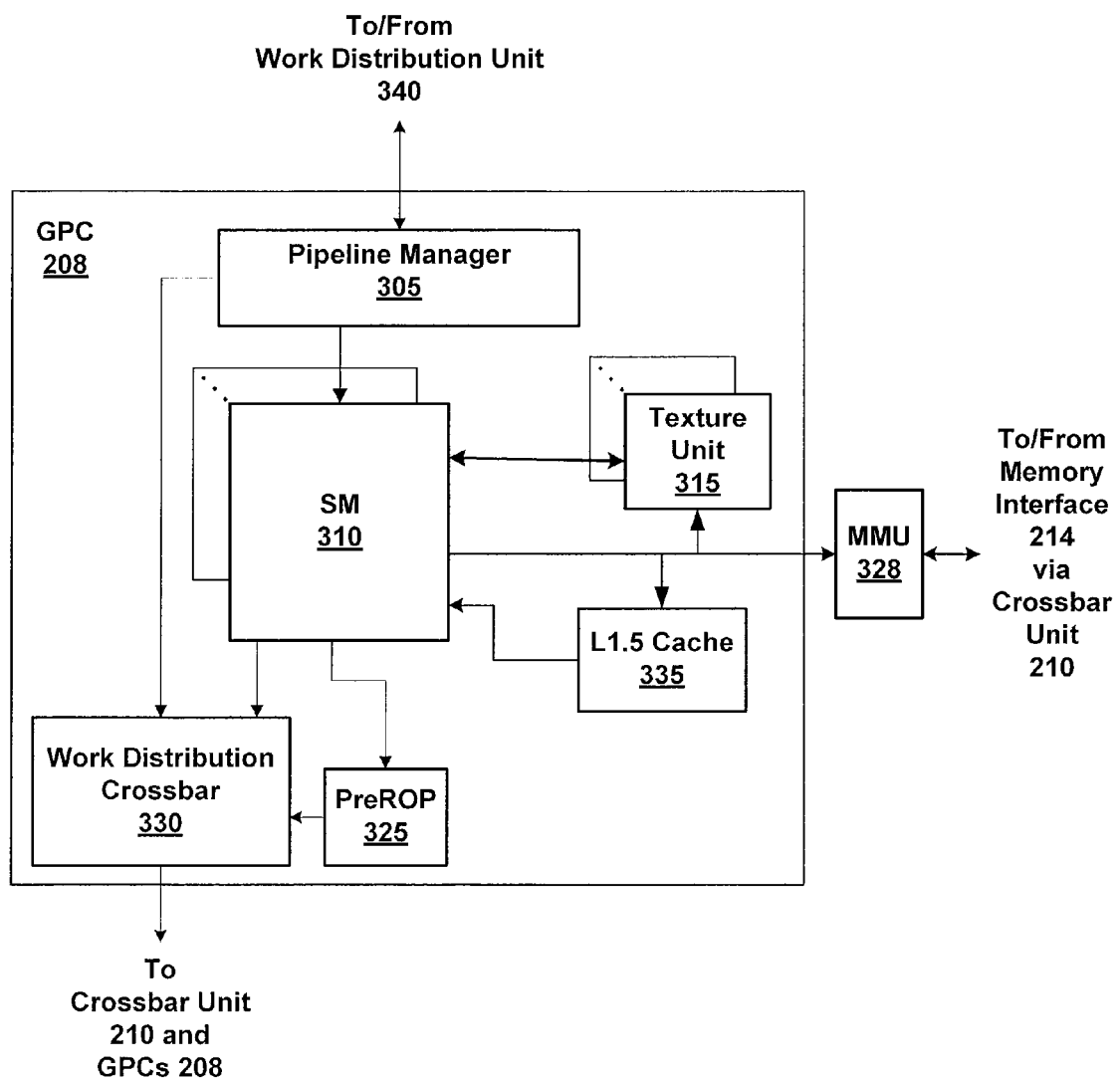
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Program Execution And Preemption

Preemption may be used to time-slice a processor between multiple different applications so that the different applications are serialized and each execute for a short time-slice on the processor. Preemption may also be used to unload the currently executing context for other purposes. For example, the host interface 206 may preempt a context when the CPU 102 initiates a channel preempt or a runlist preempt, where a channel is a collection of pointers to processing work and an application may contain one or more channels. A channel preempt is performed by clearing a valid bit in a channel ram entry and writing a channel identifier of the channel to be preempted to a preempt register. The specified channel is then unloaded from the PPU 202 off both host and the engine.

A runlist preempt is performed by writing a pointer to the runlist register. The pointer may point to a new runlist or may point to the runlist that is currently active. Runlist preempt causes what is running in a PPU 202 to be unloaded. The host interface 206 then begins processing at the first entry on the runlist associated with the pointer and searches for the first valid entry with pending work. The first channel on the runlist which has pending work is loaded into the PPU 202.

The host interface 206 may also preempt a context that is executing before a time slice has expired when the context is out of methods (i.e. programs) and another context is waiting to execute. In one embodiment, the time slices are not equal amounts of time, but instead are based on each context's method stream, so that a context with a dense method stream is allocated a larger time slice compared with a different context having a sparse method stream. The host interface 206 is configured to indicate to the front end 212 when the host interface 206 does not have any methods for an executing context. However, the host interface 206 does not initiate a context switch for the executing context until either the time slice allocated to the context has expired or the processing pipeline is idle and there are no methods.

Figure 4:
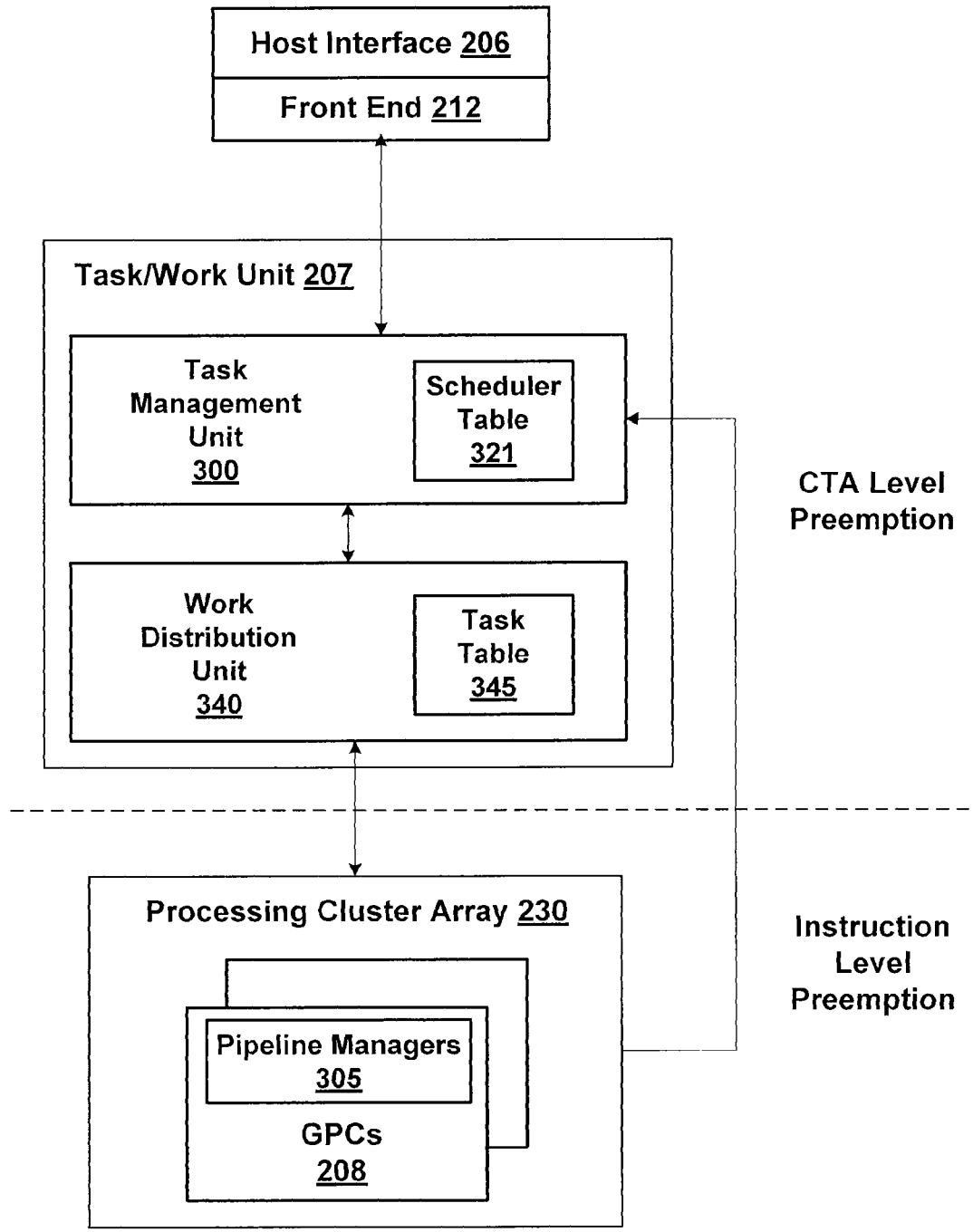
FIG. 4 is a block diagram of the processing pipeline, according to one embodiment of the invention.

FIG. 4 is a block diagram of the host interface 206 and the processing pipeline beginning with the task/work unit 207 through the GPCs 208, according to one embodiment of the invention. The preemption process has five phases that are controlled by the front end 212. A first phase (phase 1) stops the processing in the current context. For CTA level preemption this means stopping work at a CTA task boundary. For instruction level preemption this means stopping work at an SM 310 instruction boundary. If an interrupt or fault occurs after preemption is initiated and during phase 1, the front end 212 waits for the pending interrupt or fault to be cleared before proceeding to phase 2.

Once the context is stopped (and any interrupts or faults are cleared), phase 2 saves the current context's state in memory. Phase 3 resets the engine before phase 4 loads a new context's state onto the machine. Phase 5 restarts the processing of any work that was preempted in a previous Phase 1. When preempting a context, the host interface 206 selects a new context from the runlist to execute and instructs the front end 212 to begin context preemption. The front end 212 configures the processing pipeline to execute the new context by completing the five phases of the preemption process. After the five phases of the preemption process are completed, the front end 212 sends an acknowledge (ACK) to the host interface 206. In one embodiment a separate graphics processing pipeline (not shown in FIG. 4) performs graphics-specific operations and the front end 212 also waits for the graphics processing pipeline to become idle. Typically, the graphics processing methods execute in shorter times compared with compute processing methods, so waiting for the graphics processing pipeline to become idle may be completed while the processing pipeline completes the first phase of the preemption process. Also, the amount of state information that is maintained in a graphics processing pipeline is typically much larger than the context state maintained in the (compute) processing pipeline. Waiting for the graphics processing pipeline to idle significantly reduces the storage needed to capture the context state.

Before preemption is performed, a context buffer to store the CTA level (and instruction level) context state for a particular context is allocated by a program executed on the CPU 102. The size of the context buffer that is allocated may be based on the PPU 202 configuration and the number of SMs 310.

To complete the first phase of the preemption process, the front end 212 stops accepting new methods from the host interface 206 and outputs a preempt command to the task/work unit 207. When the preempt command is received by a processing unit, the processing unit stops outputting work to a downstream unit. The front end 212 waits for all downstream units to stop outputting work, and then asserts a context freeze signal to being the second phase of the preemption process. Assertion of the context freeze signal ensures that the processing pipeline does not perform any operation based on the transactions used to save the context state. The front end 212 also determines if a wait-for-idle command is being processed which requires the front end 212 to wait for the processing pipeline to become idle, and, if so, the front end 212 interrupts the wait-for-idle operation and saves context state information indicating that a wait-for-idle command was being executed for the context. When the context is resumed, the wait-for-idle execution will be restarted by the front end 212.

When the task/work unit 207 receives the preempt command, the task/work unit 207 stops launching new work. Eventually, the task/work unit 207 determines that the first two phases of the preemption process are complete and notifies the front end 212 that the processing pipeline is idle. The front end 212 will then store the context state maintained within the task/work unit 207 before resetting the processing pipeline to complete the third phase of the preemption process. When instruction level preemption is used, the context state maintained within the GPCs 208 is stored by the GPCs 208 themselves. When the CTA level preemption is used, the GPCs 208 are drained so that the amount of context state that is stored is reduced.

Even after the task/work unit 207 stops launching work, the task/work unit 207 may receive additional work that may be generated by the GPCs 208 during execution of previous instructions. The task/work unit 207 buffers the additional work to be stored by the front end 212 as part of the context state for the task/work unit 207.

When the preempt command is received, the work distribution unit 340 stops launching CTAs. When CTA level preemption is performed, the processing units in the processing pipeline that are downstream from the work distribution unit 340, e.g., GPCs 208, are drained so that no context state remains in those downstream processing units. Therefore, the amount of context state is reduced when CTA level preemption is performed compared with instruction level preemption because instruction level preemption does not require draining the downstream processing units.

The work distribution unit 340 determines which GPCs 208 will execute received work based on information generated by the task management unit 300. Because the GPCs 208 are pipelined, a single GPC 208 may execute multiple tasks concurrently. The task management unit 300 schedules each processing task for execution as either a grid or queue. The work distribution unit 340 associates each CTA with a specific grid or queue for concurrent execution of one or more tasks. CTAs that belong to a grid have implicit x, y, z parameters indicating the position of the respective CTA within the grid. The work distribution unit 340 tracks the available GPCs 208 and launches the CTAs as GPCs 208 are available.

During instruction level preemption, the work distribution unit 340 passes the preempt command to the pipeline manager 305 in the GPCs 208. The pipeline manager 305 may include a controller for each SM 310. Upon receiving the preempt command, the SMs 310 stop issuing instructions and enter a trap handler. The SMs 310 also wait for all memory transactions associated with previously issued instructions to complete, i.e., for all outstanding memory requests to complete. Memory requests are considered to be outstanding when data for a read request has not been returned and when an acknowledgement has not been received from the MMU 328 for a write request for which an acknowledgement was explicitly requested. The pipeline managers 305 maintain information about CTAs and thread groups and track which thread groups are preempted per CTA.

Once the SMs 310 in the GPCs 208 have stopped issuing instructions and each SM 310 becomes idle, the trap handler unloads the context state for the CTAs running on the GPCs 208 and a combination of one or more of the trap handler, the pipeline manager 305, and the front end 212 stores the context state. The context state that is unloaded and stored includes registers within the SMs 310, registers within the pipeline manager 305, registers within the GPCs 208, shared memory, and the like, is saved to a predefined buffer in graphics memory. Also, writes to memory from the caches within the GPCs 208, e.g., L1.5 cache 335, are forced out to memory and the caches are invalidated. Once all the context state has been unloaded and stored, the trap handler will exit all active threads, thereby idling the SMs 310 and the GPCs 208.

The trap handler then controls a signal from the SMs 310 to the pipeline manager 305 indicating that the first two phases of the preemption process have been completed by the GPCs 208 and that the GPCs 208 are idle. The pipeline manager 305 reports to the work distribution unit 340, ACKing the preempt command to indicate that the first two phases of the preemption process have been completed. This ACK is passed upstream from the work distribution unit 340 to the task management unit 300 and finally up to the front end 212.

The pipeline manager 305 holds state information for each thread group that was executing within the GPC 208 when the preempt command was output by the work distribution unit 340. The state information indicates whether a thread group exited after completing execution or if the thread group was preempted. The state information is saved by the pipeline managers 305 and may be used by the pipeline managers 305 to restore only those thread groups that were preempted. When all of the threads in a thread group exit after the pipeline manager 305 receives the preempt command and before the trap handler is entered to store the state information, state information is not stored for the thread group and the thread group is not restored. After the GPCs 208 are idle, the GPCs may be reset to complete the third phase of the preemption process.

The front end 212 then completes the second phase of the preemption process by writing out the context state maintained by the front end 212. The front end 212 saves all registers and ramchains out into the context state buffer for the preempted context. To complete the third phase of the preemption process, the front end 212 asserts a context-reset signal that is received by the processing pipeline, e.g., the task/work unit 207, and the GPCs 208.

When a context is selected to be executed, the host interface 206 needs to determine if the selected context is a context that was previously preempted. A context reload (ctx_reload) flag indicating whether a context was preempted is maintained by the host interface 206. When the host interface 206 recognizes that the selected context was preempted, the previously unloaded and stored context state is reloaded before execution of the selected context resumes. A context that has been preempted will be reloaded even when there are no methods left for the selected context because there may be work that was generated by the SMs 310 during execution of the methods and saved as part of the context state.

The front end 212 signals to the host interface 206 whether the context was idle when the host interface 206 initiated the preemption. If the context was idle, i.e., the processing pipeline was idle and there were no outstanding memory requests, the preempted context does not need to be reloaded before execution of the context resumes. If the context was not idle, the host interface 206 saves the context reload state to be processed when the channel is reloaded.

There is also the case where the processing pipeline is already idle when the front end 212 receives the preempt command from the host interface 206. When the processing pipeline is already idle, the front end 212 does not send a preempt command to the task/work unit 207, but rather continues with the second phase of the preemption process. Therefore, the idle state of the task/work unit 207 and GPCs 208 should enable those units to receive a new context state or restore a context state. For example, the task/work unit 207 should be in a state such that no tasks are running. The pipeline managers 305 should restore only preempted thread groups or CTAs and should not restore thread groups that exited.

When the front end 212 completes the fourth phase of the preemption process, the selected context state is read from a context buffer and loaded into the registers and ramchains. The context freeze signal is asserted by the front end 212 from the start of the second phase until the end of the fourth phase of the preemption process. Assertion of the context freeze signal ensures that the processing pipeline does not perform any operation based on the transactions used by the front end 212 to save and restore the context state.

The front end 212 initiates the fifth phase (phase 5) of the preemption process by outputting a preempt restore command to the task/work unit 207. After the task/work unit 207 receives the preempt restore command, the task/work unit 207 does not assert a ready signal to the front end 212 so that no new work can be passed from the front end 212 to the task/work unit 207 until the preemption process is completed. The work distribution unit 340 within the task/work unit 207 receives the preempt restore command and restores the selected context state, replaying the restored tasks into the GPCs 208, and restoring preempted CTAs and thread groups back into the pipeline managers 305 and the SMs 310, respectively.

For example, a pipeline manager 305 outputs the preempt restore command to configure a respective SM 310 to enter "preemption-restore-begin" mode. Then the pipeline manager 305 sends the preempted CTAs and thread groups to the SM 310. After the pipeline manager 305 has restored all preempted thread groups, the pipeline manager 305 outputs a command to the SM 310 indicating that the "preemption-restore-end" mode should be exited. When the CTA level preemption is used, the GPCs 308 do not have any stored context state to reload and there is no thread group state to restore.

When instruction level preemption is used to restore a selected context, the GPCs 308 read the context state for the selected context from a context buffer and load the registers and shared memory. Pipeline managers 305 restart all the CTAs that were preempted by sending the CTAs to the respective SM 310 which each CTA was executing on, in the order that the CTAs were reported preempted. This technique ensures that each CTA is launched in the same physical CTA slot in an SM 310 as the CTA occupied when the context was preempted. Thread groups are launched in the same physical thread group ID. Restarting the thread groups in the same location after preemption is advantageous because the thread groups and CTAs are guaranteed to not exceed the memory and other resources available in the respective SM 310. Each SM 310 restores register values, barriers, a program counter, stack pointer, active mask for each thread group, and the like.

Finally, The front end 212 ACKs the original preemption command to the host interface 206. The ACK indicates the preemption process is complete and execution of the selected context has been initiated. Any previously preempted CTAs have resumed execution in the Task/Work Unit 207 and the GPCs 208. When instruction level preemption is used, any previously preempted threads have resumed execution on the SMs 310. The Host interface 206 may now start sending new work into the graphics pipeline.

In one embodiment, the front end 212 ACKs the original preemption command after outputting the preempt restore command to the task/work unit 207 and the task/work unit 207 buffers any new work that is received after the preempt restore command until phase 5 is completed. The task/work unit 207 does not launch any new (unrestored) CTAs until the preemption process is completed. The front end 212 is therefore unaware of when the fifth phase is completed. If the task/work unit 207 cannot buffer all of the new work, the task/work unit 207 negates the ready signal to the front end 212. However, the front end 212 is not able to distinguish whether the ready signal is negated during or after completion of the preemption process.

Figure 5A:
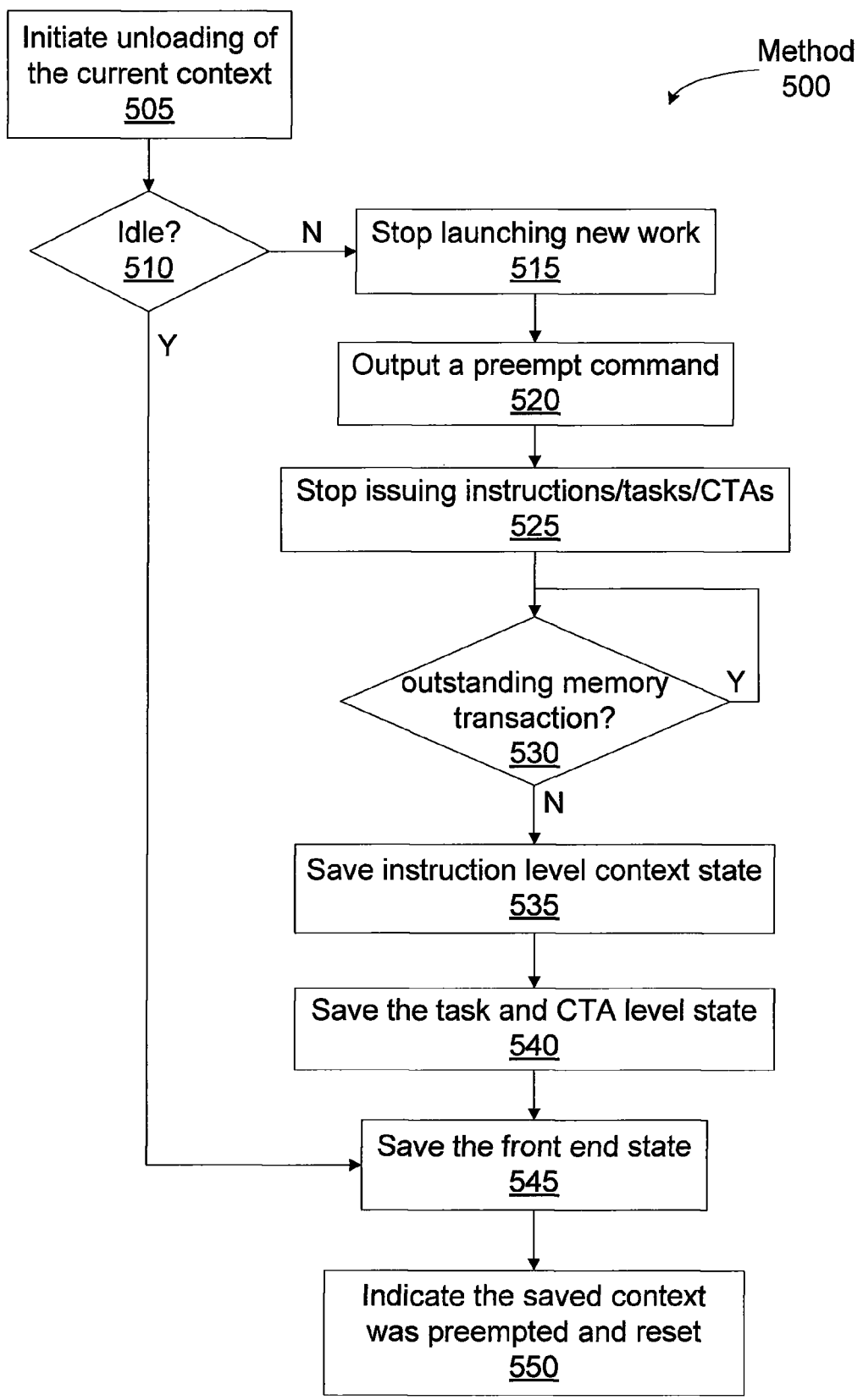
FIG. 5A illustrates an unload method for unloading context state when a process is preempted, according to one embodiment of the invention.

FIG. 5A illustrates an unload method 500 for unloading context state when a process is preempted at an instruction level, according to one embodiment of the invention. Although the method steps are described in conjunction with the systems of FIGS. 1, 2, 3A, 3B, and 4, persons skilled in the art will understand that any system configured to perform the method steps, in any order, is within the scope of the inventions.

At step 505 the host interface 206 outputs an instruction level preemption command to the front end 212 and the unloading of the current context is initiated. At step 510 the front end 212 determines if the processing pipeline is idle, and, if so, then the front end 212 proceeds directly to step 545 to store the context state that is maintained by the front end 212.

If, at step 510 the front end 212 determines that the processing pipeline is not idle, then at step 515 the front end 212 stops launching new work for the current context. At step 520 the front end 212 outputs a preempt command to the task/work unit 207. At step 525 the task management unit 300 within the task/work unit 207 stops issuing tasks to the work distribution unit 340 and outputs the preempt command to the work distribution unit 340. At step 525 the work distribution unit 340 also stops launching CTAs and outputs the preempt command to the pipeline managers 305. The pipeline managers 305 output the instruction level preempt command to the SMs 310.

At step 525 the SMs 310 stop executing instructions and in step 530 the SMs 310 wait for any outstanding memory transactions to complete. Each SM 310 repeats step 530 until all of the memory transaction are completed. The SMs 310 indicate to the pipeline manager 305 whether each thread group exited or was preempted. When all of the outstanding memory transactions are complete, at step 535 the context state maintained in the SMs 310 is stored into a context buffer and the context state maintained in the pipeline managers 305 is also stored into the context buffer.

At step 540 the pipeline managers 305 report to the work distribution unit 340 that the instruction level portion of the processing pipeline, e.g., the SMs 310 and the GPCs 208, are idle and the work distribution unit 340 then saves the CTA level state that is maintained in the work distribution unit 340 for the current context. The work distribution unit 340 reports to the task management unit 300 that it has completed this phase of preemption. The task management unit 300 then saves the task level state maintained in the task management unit 300. The task management unit 300 reports to the front end 212 when the current state has been stored, and at step 545 the front end 212 stores the context state that is maintained for the current context by the front end 212 to the context buffer. At step 550 the front end 212 then stores an indication that the saved context state is for a preempted context, and resets the processing pipeline.

Figure 5B:
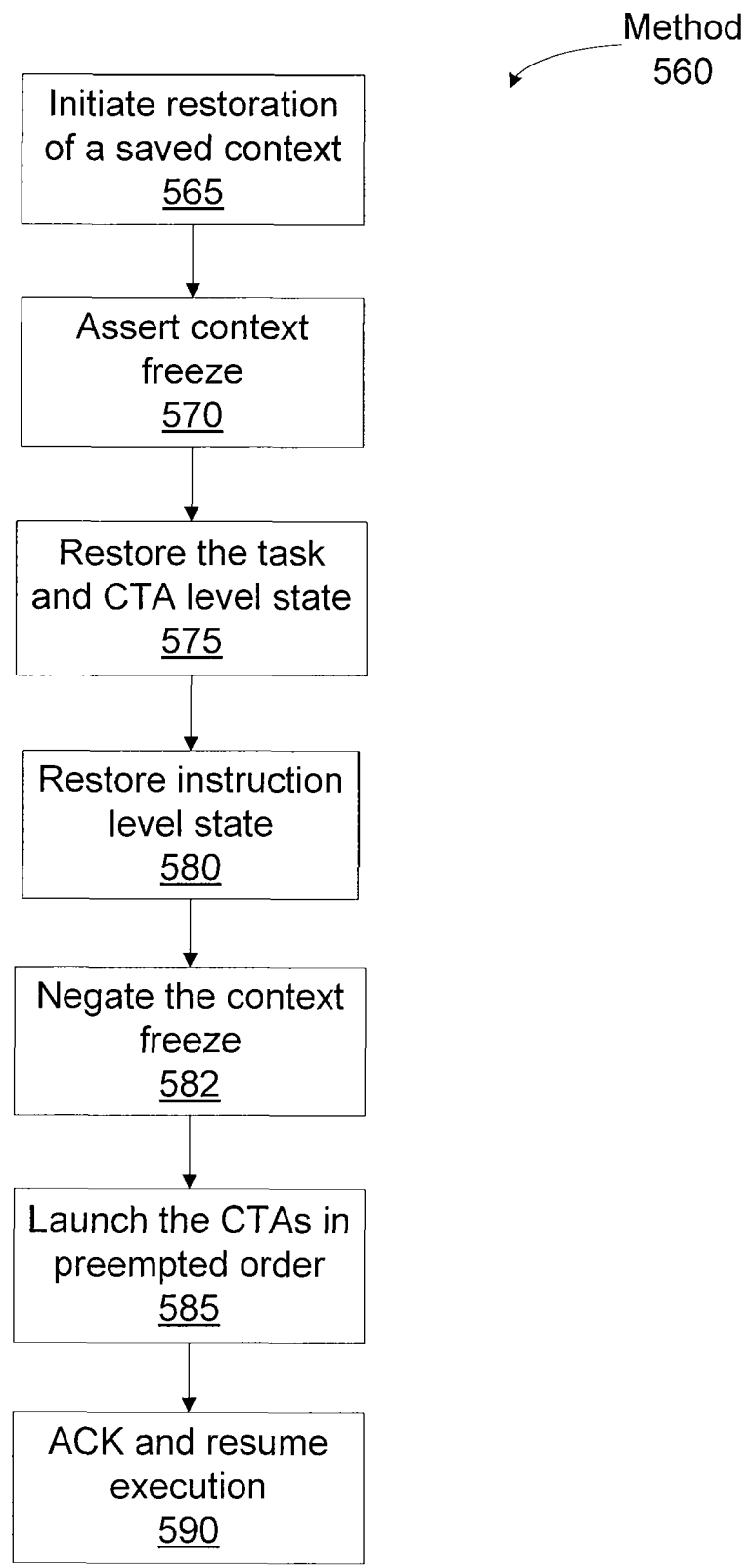
FIG. 5B illustrates a restore method for restoring context state when a preempted process is restored, according to one embodiment of the invention.

FIG. 5B illustrates a restore method 560 for restoring context state when a process that was preempted at the instruction level is restored, according to one embodiment of the invention. Although the method steps are described in conjunction with the systems of FIGS. 1, 2, 3A, 3B, and 4, persons skilled in the art will understand that any system configured to perform the method steps, in any order, is within the scope of the inventions.

At step 565 the front end 212 initiates restoration of a saved context for a context selected by the host interface 206. At step 570 the front end 212 asserts the context freeze signal to ensure that the processing pipeline does not perform any operation based on the transactions used by the front end 212 to restore the context state. At step 575 the selected context state is read from a context buffer by the front end 212 and task/work unit 207, and restored at the task and CTA level.

At step 580 each pipeline manager 305 outputs a command down to configure the respective SM 310 to enter "preemption-restore-begin" mode, thereby configuring the SMs 310 into a paused state. At step 580 the pipeline manager 305 sends preempted CTAs and thread groups to the SMs 310 and the GPCs 208 restore the instruction level context state maintained in the SMs 310 for the selected context. After the CTA and instruction level state is restored, the pipeline managers 305 output a command to the respective SMs 310 indicating that the "preemption-restore-end" mode should be exited and, at step 582 the front end 212 negates the context freeze signal. Steps 580 and 582 may be performed simultaneously. At step 585 the CTAs are launched in the preempted order and at step 590 execution is resumed using the restored context state for the selected context. At step 590, the front end 212 also ACKs the host interface 206 to signal that the instruction level preemption command has completed execution. The Host interface 206 may now start sending more work from the pushbuffer to the front end 212. In one embodiment, the task/work unit 207 asserts and negates the context freeze and step 590 is performed (by the front end 212) after the context freeze is asserted in step 570. The task/work unit buffers the new work from the pushbuffer until the instruction level preemption command has completed execution. The new work is not output by the task/work unit until after the CTAs are launched in step 585.

As previously explained, the context state that is saved and restored may be reduced at the expense of potentially longer latencies for stopping the running context by preempting at the CTA level instead of preempting at the instruction level. When a context is preempted at the CTA level the SMs 310 complete execution of any launched CTAs, so that there is not CTA state maintained within the pipeline managers 305 and GPCs 208 that needs to be stored.

Figure 6A:
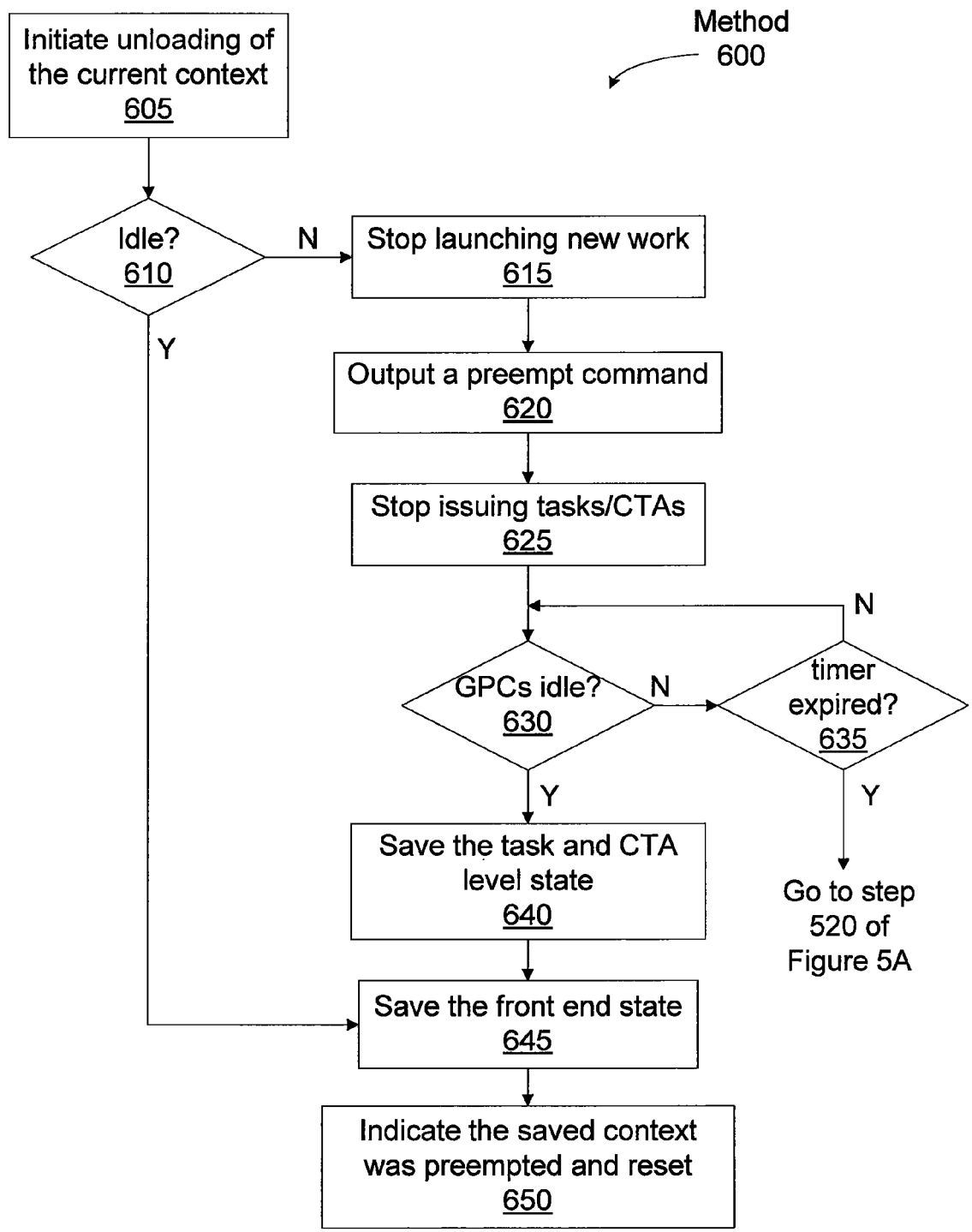
FIG. 6A illustrates another unload method for unloading context state when a process is preempted, according to one embodiment of the invention.

FIG. 6A illustrates an unload method 600 for unloading context state when a process is preempted at a CTA level, according to one embodiment of the invention. Although the method steps are described in conjunction with the systems of FIGS. 1, 2, 3A, 3B, and 4, persons skilled in the art will understand that any system configured to perform the method steps, in any order, is within the scope of the inventions.

At step 605 the host interface 206 outputs a CTA level preemption command to the front end 212 and the unloading of the current context is initiated. At step 610 the front end 212 determines if the processing pipeline is idle, and, if so, then the front end 212 proceeds directly to step 645 to store the context state that is maintained by the front end 212.

If, at step 610 the front end 212 determines that the processing pipeline is not idle, then at step 615 the front end 212 stops launching new work for the current context. At step 620 the front end 212 outputs a preempt command to the task/work unit 207. At step 625 the task management unit 300 within the task/work unit 207 stops issuing tasks to the work distribution unit 340 and outputs the preempt command to the work distribution unit 340. The work distribution unit 340 stops launching CTAs and, at step 630, the work distribution unit 340 waits for the GPCs 208 to become idle.

If, at step 630 the work distribution unit 340 determines that the GPCs 208 are not idle, then at step 635, the work distribution unit 340 determines if a timer has expired. The timer limits the number of clock cycles that the work distribution unit 340 will wait for the GPCs to become idle. The number of clock cycles may be a programmed value, and, in one embodiment, when the value is exceeded, the work distribution unit 340 performs preemption at the instruction level instead of at the CTA level. If, at step 635, the work distribution unit 340 determines that the timer has not expired, then the work distribution unit 340 returns to step 630. Otherwise, when the timer has expired, then the work distribution unit 340 proceeds to step 520 of FIG. 5A to perform preemption at the instruction level.

When at step 630 the GPCs 208 are idle, at step 640 the work distribution unit 340 saves the CTA level state that is maintained in the work distribution unit 340 for the current context. The work distribution unit 340 reports to the task management unit 300 the current state has been stored. The task management unit 300 then saves the task level state that is maintained in the task management unit 300. The task management unit 300 reports to the front end 212 when the current state has been stored, and at step 645 the front end 212 stores the context state that is maintained for the current context by the front end 212 to the context buffer. At step 650 the front end 212 then stores an indication that the saved context state is for a preempted context and resets the processing pipeline.

Figure 6B:
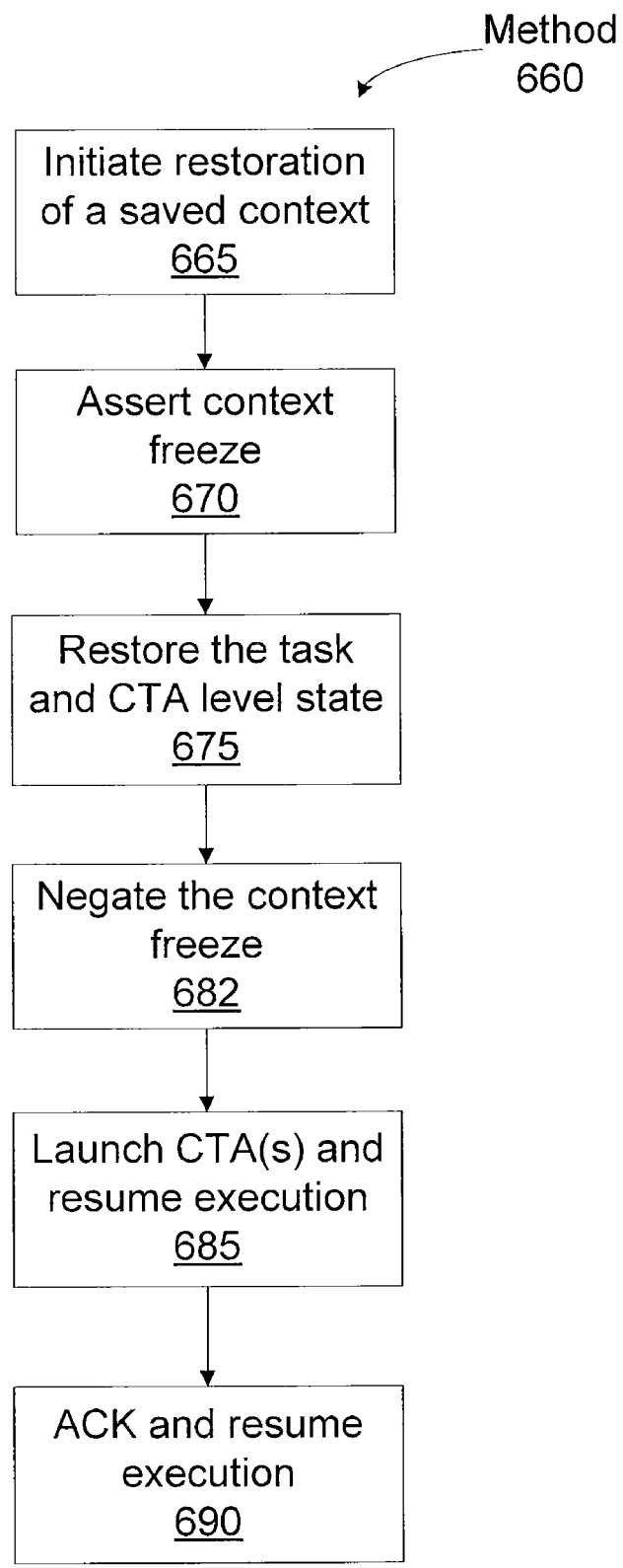
FIG. 6B illustrates another restore method for restoring context state when a preempted process is restored, according to one embodiment of the invention.

FIG. 6B illustrates a restore method 660 for restoring context state when a process that was preempted at the CTA level is restored, according to one embodiment of the invention. Although the method steps are described in conjunction with the systems of FIGS. 1, 2, 3A, 3B, and 4, persons skilled in the art will understand that any system configured to perform the method steps, in any order, is within the scope of the inventions.

At step 665 the front end 212 initiates restoration of a context that was previously preempted at the CTA level. At step 670 the front end 212 asserts the context freeze signal to ensure that the processing pipeline does not perform any operation based on the transactions used by the front end 212 to restore the context state. At step 675 the selected context state is read from a context buffer by the front end 212 and task/work unit 207, and restored at the task and CTA level. At step 682 the context freeze signal is deasserted.

At step 685 the CTAs that were preempted the last time this context was running are relaunched by the task/work unit 207 into the GPCs 208. At step 690 the front end 212 ACKs the host interface 206 to signal that the CTA level preemption command has completed execution. The Host interface 206 may now start sending more work from the pushbuffer to the front end 212. In one embodiment, the task/work unit 207 asserts and negates the context freeze and step 690 is performed (by the front end 212) after the context freeze is asserted in step 670. The task/work unit buffers the new work from the pushbuffer until the instruction level preemption command has completed execution. The new work is not output by the task/work unit until after the CTAs are relaunched in step 685.

The ability to preempt a context at either the instruction level or at the CTA level may be specified for each particular context. A long-running context may be preempted at the instruction level to avoid a long delay between when the preemption is initiated to when the preemption is completed. A context that is not necessarily long-running, but that maintains a large amount of state may be preempted at the CTA level to minimize the amount of context state that is stored.

Software-Assisted Instruction Level Preemption

Referring back to FIG. 3A, the task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a linked list. When compute tasks are received from the host interface 206 the task management unit 300 inserts the compute tasks into a TMD group. More specifically, a pointer to the TMD corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed.

A software-assisted mechanism may be used in combination with the hardware implemented CTA level preemption to perform instruction level preemption. When CTA level preemption is performed instruction level context state that is maintained within the SMs 310 is not stored and the GPCs 208 and MPCs 415 are drained. The software-assisted instruction level preemption does store the instruction level context and allows for the preemption to occur quickly because the GPCs 208 and MPCs 415 are not drained. The software-assist mechanism exploits the capability of the GPCs 208 to generate child processing tasks that are output to the task/work unit 207 during execution of a processing task. A child processing task that is generated to perform the software-assisted instruction level preemption is encoded as preemption TMD and is added to the head of the linked list of the highest priority TMD group so that the preemption TMD will be scheduled and executed before any other TMDs. The preemption TMD includes a preemption-restore kernel and a pointer to a context buffer that stores the context state for the preempted context. A single preemption TMD is generated for all preempted CTAs that were launched to execute the same TMD. When CTAs for two different TMDs are executing, two preemption TMDs will be generated to preempt the two different contexts.

Before software-assisted instruction level preemption is performed, memory for the preemption TMD and a context buffer to store the instruction level context state are allocated by a program executed on the CPU 102. The purpose of the preemption TMD is to invoke a preemption-restore kernel for each CTA that was preempted. The size of the context buffer is known before preemption is initiated because the size is based on the processing pipeline, the number of SMs 310, and the size of a TMD that is executed for the particular context.

The software-assisted instruction level preemption is initiated by first performing CTA level preemption. When the preemption command is received by the GPCs 208, the trap handler that includes the preemption-save kernel is executed for each CTA. When the preemption-save kernel is executed for a CTA, the context state maintained for execution of the CTA is stored in a portion of the context buffer. The data necessary to restore the instruction level state for the preempted CTA is stored in the portion of the context state buffer. The preemption-save kernel may access the instruction level state by reading architectural registers, reading state from memory-mapped registers, execution of special instructions, or by a combination of instruction execution and memory accesses performed by an SM 310. The data necessary to restore the instruction level state for the context may include the starting program counter of the preemption restore program instructions, a pointer to the portion of the context state buffer where the context state for the particular CTA is stored, constant buffer values, a number of registers used by the CTA, an amount of shared memory used by the CTA, and the like.

Once the preemption-save kernel has stored the instruction level context state, the preemption-save kernel notifies the task/work unit 207 that a child processing task, or, more specifically, a preemption TMD has been generated. The preemption TMD is not immediately scheduled by the task/work unit 207 because the task/work unit 207 has received the preempt command and is performing the preemption operations. However, the preemption TMD is stored in a buffer along with any other additional work transmitted to the task/work unit 207 after the preempt command was received. The preemption TMD is stored by the front end 212 as part of the context state for the task/work unit 207.

Finally, the preemption-save kernel ends with an exit instruction that causes the CTA to exit the SM 310, so that the SM 310 becomes idle and appears to have drained as expected during normal CTA level preemption. The preemption-restore kernel performs restoration of the instruction level context state when a context that was preempted is resumed. When restoring the instruction level context state, the CTA level context state, including the preemption TMD, is first restored. Then, because the preemption TMD generated by the preemption-save kernel during the preemption process has a highest priority level, the preemption TMD is scheduled for execution by the task/work unit 207 before any other TMD.

The preemption-restore kernel included in the preemption TMD is executed by the SMs 310 and the instruction level state stored in the context buffer for each CTA is restored by the respective SM 310. The preemption-restore kernel also sets up the call stack such that an AtExit routine is invoked by the CTA when the CTA exits. After setting up the call stack, the preemption-restore kernel execution is complete and the CTA proceeds to execute user code at the point where the CTA was preempted. When the CTA runs to the normal exit point, The AtExit routine is invoked to free the preemption related resources, such as the memory allocated for storing the TMD and the portion of the context state buffer allocated for each CTA. After the AtExit routine is executed, the CTA exits.

Figure 7A:
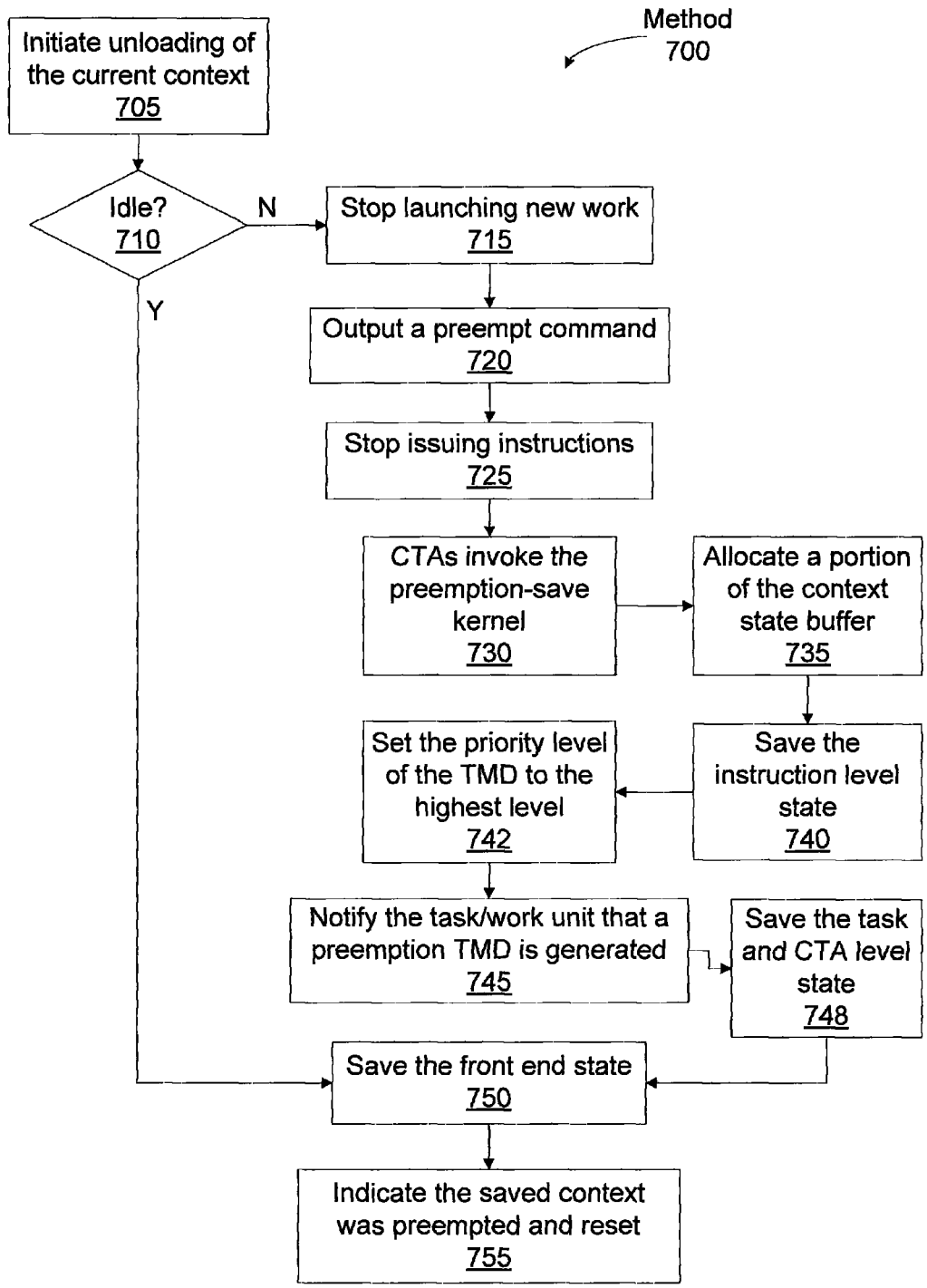
FIG. 7A illustrates a software assisted unload method for unloading context state when a process is preempted, according to one embodiment of the invention.

FIG. 7A illustrates a software assisted unload method 700 for unloading context state when a process is preempted, according to one embodiment of the invention. Although the method steps are described in conjunction with the systems of FIGS. 1, 2, 3A, 3B, and 4, persons skilled in the art will understand that any system configured to perform the method steps, in any order, is within the scope of the inventions.

As previously explained, when a context is initialized, a context buffer is allocated and when software-assisted instruction level preemption is enabled for the context, a preemption TMD is allocated for use by the preemption-save and preemption-restore kernels. The preemption-save and preemption-restore kernels and the AtExit routine are stored in memory. A program is then executed by the processing pipeline using the context. At step 705 the host interface 206 outputs a CTA level preempt command to the front end 212 and the unloading of the current context is initiated. At step 710 the front end 212 determines if the processing pipeline is idle, and, if so, then the front end 212 proceeds directly to step 750 to store the context state that is maintained by the front end 212.

If, at step 710 the front end 212 determines that the processing pipeline is not idle, then at step 715 the front end 212 stops launching new work for the current context. At step 720 the front end 212 outputs a preempt command to the task/work unit 207. At step 725 the task/work unit 207 stops issuing instructions to the CWD 410 and outputs the preempt command to the CWD 410. The CWD 410 stops launching CTAs and, at step 730, the CWD 410 waits for the GPCs 208 to become idle and the preemption-save kernel is invoked by the CTAs executing on the SMs 310.

The preemption-save kernel is executed by each CTA. At step 735 the preemption-save kernel first allocates a portion of the context buffer for storing the instruction level context state that is maintained within the respective SM 310. At step 740 the preemption-save kernel saves the instruction level context state in the portion of the context state buffer. Steps 730, 735, and 740 are performed for each CTA that is being executed by an SM 310.

At step 742 the preemption-save kernel sets the priority level of the preemption TMD to the highest priority level. At step 745 the preemption-save kernel notifies the task/work unit 307 that a preemption TMD was generated and the preemption-save kernel executes an exit instruction, causing each CTA to exit the SM 310 and idle the GPCs 208 and MPCs 415.

When the GPCs 208 are idle, at step 748 the CWD 410 saves the CTA level state that is maintained in the CWD 410 for the current context. The CWD 410 reports to the front end 212 when the current state has been stored, and at step 750 the front end 212 stores the context state that is maintained for the current context by the front end 212 to the context buffer. At step 755 the front end 212 then stores an indication that the saved context state is for a preempted context and resets the processing pipeline.

Figure 7B:
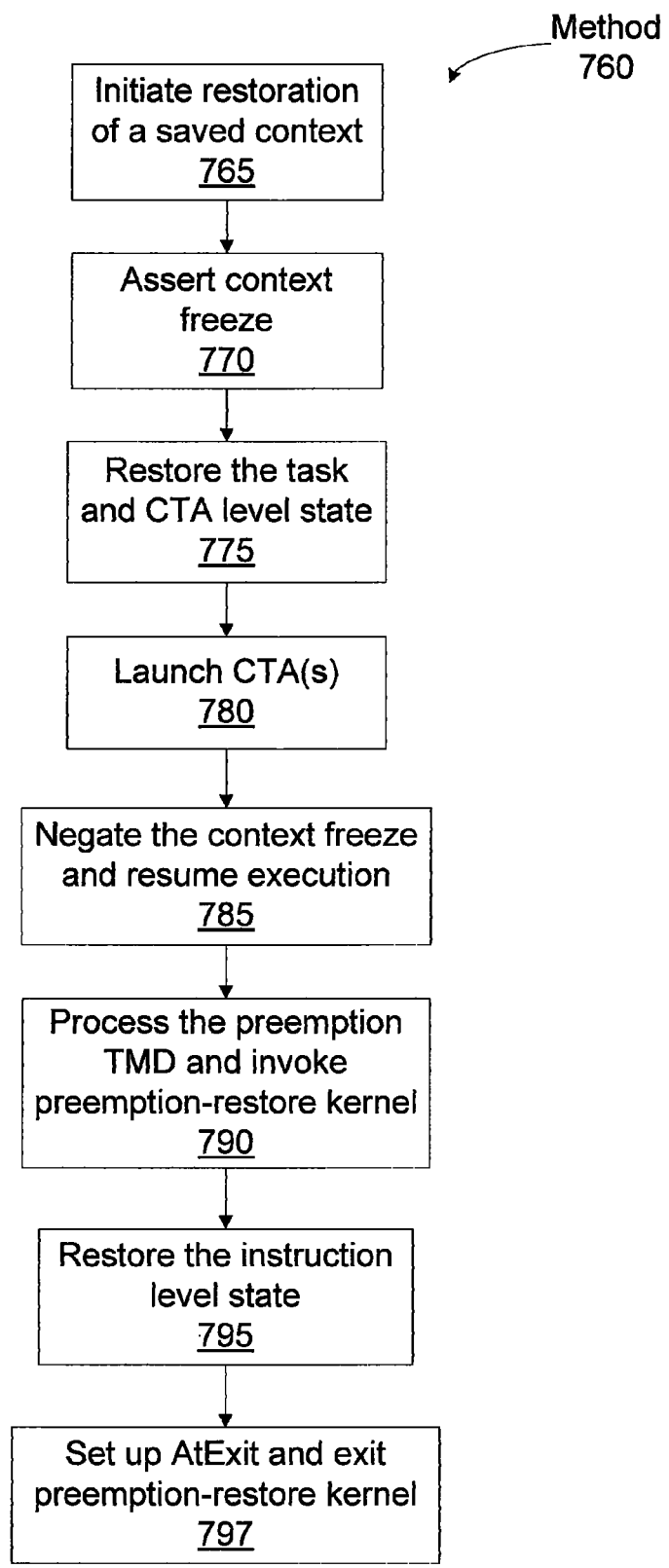
FIG. 7B illustrates a software-assisted restore method for restoring context state when a preempted process is restored, according to one embodiment of the invention.

FIG. 7B illustrates a software-assisted restore method 760 for restoring context state when a preempted process is restored, according to one embodiment of the invention. Although the method steps are described in conjunction with the systems of FIGS. 1, 2, 3A, 3B, and 4, persons skilled in the art will understand that any system configured to perform the method steps, in any order, is within the scope of the inventions.

At step 765 the front end 212 initiates restoration of a context that was previously preempted using software-assisted instruction level preemption. At step 770 the front end 212 asserts the context freeze signal to ensure that the processing pipeline does not perform any operation based on the transactions used by the front end 212 to restore the context state. At step 775 the selected context state is read from a context buffer by the front end 212, task/work unit 207, and CWD 410 and restored at the CTA level.

At step 780 the CTAs are launched in the preempted order. At step 785 the front end 212 negates the context freeze signal and execution is resumed using the restored CTA level context state for the selected context. The front end 212 also ACKs the host interface 206 to signal that the CTA level preemption command has completed execution. Note, that the instructions level context state is not yet restored.

At step 790 the task/work unit 207 schedules the preemption TMD for execution and each of the CTAs invokes the preemption-restore kernel. At step 795 the instruction level context state that was stored for each CTA is read and restored to the respective SM 310 for use by the CTA. At step 797 the execution stack is set up for the AtExit routine so that the memory allocated for the preemption TMD and context buffer will be deallocated (or freed). At step 797 the preemption-restore kernel also exits and the user code resumes execution using the restored context. When the user code reaches the normal exit point, the AtExit routine is invoked and the preemption TMD and context buffer are freed when the last CTA exits.

The ability to preempt a context at either the instruction level or at the CTA level may be specified for each particular context. A long-running context may be preempted at the instruction level to avoid a long delay between when the preemption is initiated to when the preemption is completed. A context that is not necessarily long-running, but that maintains a large amount of state may be preempted at the CTA level to minimize the amount of context state that is stored.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of preempting execution of program instructions in a multi-threaded system, the method comprising:
   executing program instructions in a processing pipeline within the multi-threaded system as a first task metadata (TMD) using a first context;
   preempting execution using the first context to execute different program instructions in the multi-threaded system using a second context;
   invoking a preemption-restore kernel that encodes a preemption restore processing task as a second task metadata (TMD) for execution using the first context when the first context is restored; and
   executing the different program instructions in the processing pipeline using the second context.

2. The method of claim 1, wherein the preemption-restore kernel is configured to store a portion of first context state that is maintained within the processing pipeline during execution of the program instructions using the first context in a context buffer.

3. The method of claim 2, further comprising preempting execution of the different program instructions to resume execution of the program instructions using the portion of the first context state.

4. The method of claim 2, further comprising:
   invoking the preemption-restore kernel to restore the portion of the first context state to the processing pipeline; and
   resuming execution of the program instructions using the portion of the first context state.

5. The method of claim 1, wherein the preemption-restore kernel is also configured to set up a call stack to execute a routine after the program instructions are executed.

6. The method of claim 5, wherein execution of the routine frees memory allocated for storing the second TMD.

7. The method of claim 1, further comprising storing an indication that execution of the program instructions using the first context was preempted.

8. The method of claim 1, further comprising setting a priority level of the second TMD to a highest priority level.

9. The method of claim 1, further comprising:
   determining, before executing the different program instructions, that the processing pipeline is idle; and
   resetting the processing pipeline without storing context state maintained in the processing pipeline for the first context.

10. A non-transitory computer-readable storage medium storing instructions that, when executed by a processor, cause the processor to preempt execution of program instructions in a multi-threaded system, by performing the steps of:
    executing program instructions in a processing pipeline within the multi-threaded system as a first task metadata (TMD) using a first context;
    preempting execution using the first context to execute different program instructions in the multi-threaded system using a second context;
    invoking a preemption-restore kernel that encodes a preemption restore processing task as a second task metadata (TMD) for execution using the first context when the first context is restored; and
    executing the different program instructions in the processing pipeline using the second context.

11. A multi-threaded system for preempting execution of program instructions, the multi-threaded system comprising:
    a memory configured to store program instruction corresponding to a first context and different program instructions corresponding to a second context;
    a host interface coupled to a processing pipeline and configured to preempt execution of the program instructions using the first context to execute different program instructions using a second context; and
    the processing pipeline configured to:
       execute the program instructions as a first task metadata (TMD) using the first context;
       preempt execution of the program instructions using the first context to execute the different program instructions using the second context;
       invoke a preemption-restore kernel that encodes a preemption restore processing task as a second task metadata for execution using the first context when the first context is restored; and
       execute the different program instructions using the second context.

12. The multi-threaded system of claim 11, wherein the processing pipeline is further configured by the preemption-restore kernel to, before executing the different program instructions, store a portion of first context state that is maintained within the processing pipeline during the execution of the program instructions using the first context.

13. The multi-threaded system of claim 12, wherein the host interface is further configured to preempt execution of the different program instructions to resume execution of the program instructions using the portion of the first context state.

14. The multi-threaded system of claim 12, wherein the processing pipeline is further configured to:
   invoke the preemption-restore kernel to restore the portion of the first context state; and
   resume execution of the program instructions using the portion of the first context state.

15. The multi-threaded system of claim 12, wherein the processing pipeline is further configured by the preemption-restore kernel to set up a call stack to execute a routine after the program instructions are executed.

16. The multi-threaded system of claim 15, wherein execution of the routine frees a portion of the memory allocated for storing the second TMD.

17. The multi-threaded system of claim 15, wherein the processing pipeline is further configured to store an indication that execution of the program instructions using the first context was preempted.

18. The multi-threaded system of claim 11, wherein the processing pipeline is further configured by the preemption-restore kernel to store first context state for each thread group executing in a streaming multiprocessor that is preempted in the memory.

19. The multi-threaded system of claim 11, wherein the processing pipeline is further configured to:
   determine, before executing the different program instructions, that the processing pipeline is idle; and
   reset the processing pipeline without storing context state maintained in the processing pipeline for the first context.

20. The multi-threaded system of claim 11, wherein the processing pipeline is further configured by the preemption-restore kernel to restore second context state corresponding to the second context to the processing pipeline before executing the different program instructions.

* * * * *